United States Patent Office 3,213,048
Patented Oct. 19, 1965

---

3,213,048
PROCESS FOR PREPARING ORGANO-POLYSILOXANE COMPOSITIONS
Reginald J. Boot, Niskayuna, N.Y., assignor to General Electric Company, a corporation of New York
No Drawing. Filed Apr. 27, 1961, Ser. No. 105,911
3 Claims. (Cl. 260—18)

The present invention relates to a process for the preparation of plastic, putty-like organopolysiloxane compositions that exhibit a high degree of elasticity under suddenly applied stress. More particularly, the present invention relates to a process for effecting the room temperature cure of certain silanol chain-stopped polydiorganosiloxanes with an organo borate resulting in the production of valuable plastic materials.

Numerous methods are known for the production of plastic materials resulting from the reaction of polydiorganosiloxanes with boron oxygen compounds, commonly referred to as "bouncing putty." For example, McGregor et al., Patent 2,431,878, shows than an organopolysiloxane composition having desirable plastic properties can be produced by forming a mixture of a polymeric dimethyl silicone and boric oxide and heating the mixture to temperatures in excesses of 200° C. to effect the cure of the polymeric dimethyl silicone. The resulting mass can then be treated further with additional modifying ingredients such as inorganic filler and polyhydric alcohols as shown in Wright Patent 2,541,851. Although the prior arts method of producing bouncing putty results in the production of a satisfactory product, the requirement of effecting the cure of the polydiorganosiloxane at an elevated temperature often adversely affects the rheology of the product. In addition, the need for heating a large batch of material and subsequently cooling it for additional modification is economically unattractive when large scale production methods are employed.

The present invention is based on the discovery that a silanol chain-stopped polydiorganosiloxane can be cured at room temperature with an organo borate to form a plastic organopolysiloxane composition that exhibits a high degree of elasticity or rebound when it is dropped in the form of a ball. The resulting plastic organopolysiloxane composition can then be further modified with inorganic fillers and other additives if desired.

In accordance with the present invention there is provided a process for the production of plastic organopolysiloxane compositions that exhibit a high degree of elasticity under suddenly applied stress comprising agitating at a temperature in the range of 20° C. to 30° C., a mixture comprising an alkyl borate and 20 to 200 parts per part of said alkyl borate of a silanol chain-stopped polydimethylsiloxane having the formula (1) 

until a product is formed having a viscosity of at least 500,000 centipoises at a shear rate of 1 sec.$^{-1}$ at 25° C., where $n$ is equal to from 10 to 1500.

Organo borates included within the scope of the present invention are organo borates having the formula:

(2) 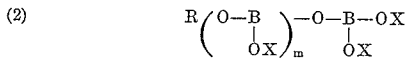

and cyclic organo borates (3) 

where $m$ is a whole number equal to from 0 to 3, $y$ is an integer equal to from 3 to 5, and R is a member selected from the class of monovalent hydrocarbon radicals and halogenated monovalent hydrocarbon radicals and X is a member selected from the class of hydrogen and R radicals.

Included within the radicals represented by R of Formulae 2 and 3 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc. R can be all the same radical or any two or more of the aforementioned radicals. R is preferably methyl.

Organo borates that are included by Formulae 2 and 3 are esters of boric acid, e.g., alkyl borates such as methyl, ethyl, propyl, isopropyl, butyl, isobutyl, amyl, hexyl, heptyl, etc. borates; aryl borates, e.g., phenyl, tolyl, xylyl, naphthyl, etc. borates; substituted ortho-borates, e.g., diethyl phenyl borate, di-isobutyl m-tolyl borate; cyclic organo borates such as trimethox-boroxene, etc.

The silanol chain-stopped polydimethylsiloxanes of Formula 1 can be prepared by any one of several well-known methods. One method is to treat a highly viscous polydimethylsiloxane with water. Highly viscous polydimethylsiloxanes, can be made for example by hydrolyzing dimethyldichlorosilane with water and thereafter condensing the hydrolysis product with either acidic or alkaline catalysts such as hydrochloric acid, sulfuric acid, potassium hydroxide, etc. Alternatively, one may heat cyclic polymers of the formula:

(4) 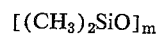

where $m$ is an integer equal to from 3 to 6, for instance, octamethylcyclotetrasiloxane, with an alkaline catalyst such as potassium hydroxide, cesium hydroxide, etc. (in an amount equal, by weight, to from about 0.001 to 0.1 percent based on the weight of the octamethylcyclotetrasiloxane) at temperatures of from 125° to 175° C. for times ranging from about 15 minutes to 2 hours or more and thereafter neutralizing the alkaline catalyst with an aqueous mineral acid such as hydrochloric acid to yield a high molecular weight polydimethylsiloxane having a viscosity of from about 700,000 to 2,000,000 centipoises when measured at 25° C. In order to obtain a silanol chain-stopped polydimethylsiloxane as shown in Formula 1, the aforementioned high molecular weight polydimethylsiloxanes can be treated with water to reduce the viscosity of the polymer to within the range of from about 10 to 100,000 centipoises at 25° C. This can be accomplished by blowing steam across the surface or through the high molecular weight polymer for a sufficient time to give the lower viscosity material having the desired silanol content. Such compositions and various methods for preparing the same are more particularly described in U.S. Patent 2,607,792 and in British Patent 791,370. The use of steam in this fashion will cause a decrease in the viscosity of the polymer while at the same time the formed linear polysiloxane will have terminal silicon-bonded hydroxy groups.

An alternative method for making the silanol chain-stopped polydimethylsiloxane of Formula 1 comprises adding water to the high molecular weight polymer described in such amounts that when heated at elevated temperatures, for instance, 150° C. to 170° C., the viscosity is reduced to the desired level of 10 to 100,000 centipoises. The amount of water used will vary depending upon such factors as the molecular weight of the polymer being treated, the time and temperature at which the mixture of high molecular weight polydimethylsiloxane water will be heated, the ultimate viscosity desired, etc. For instance, one can obtain a linear fluid methylpolysiloxane containing terminal silicon-bonded hydroxy groups and having a viscosity of from 1,000 to 3,000 centipoises at 25° C. by heating a high molecular weight methylpolysiloxane (prepared in accordance with the directions above) of about 2,000,000 centipoises viscosity, with 0.05 percent, by weight, thereof water for about 2 hours at 150° to 170° C. Another procedure for making the silanol chain-stopped polydimethylsiloxane of Formula 1 is to initially produce an intermediate halogen chain-stopped polydimethylsiloxane as shown in Patnode Patent 2,381,366, Hyde Patents 2,629,726 and 2,902,507, etc. and to neutralize this intermediate with a mild alkali such as sodium bicarbonate.

In the practice of the invention, a mixture of a silanol chain-stopped polydimethylsiloxane and an organo borate is formed at room temperature, i.e. temperatures in the range of about 20° to 30° C. by uniformly dispersing the organo borate in the silanol chain-stopped polydimethylsiloxane referred to hereafter sometimes as the "dimethyl silicone oil," in accordance with means known to the art such as with a doughmixer. The mixture is agitated until it is sufficiently cured to form what will be referred to as the "dimethyl silicone polymer" that is, the mixture achieves a viscosity at 25° C. of at least 500,000 centipoises at a shear rate of 1 sec.$^{-1}$. The dimethyl silicone polymer can then be utilized directly in many diversified applications such as therapeutic purposes, sealants, etc. or it can further modified if desired with fillers and the like.

Depending upon the nature of the dimethyl silicone oil, degree of agitation, or the organo borate utilized, that is, whether it is an aryl or alkyl borate, the cure of the dimethyl silicone oil can be effected in a few minutes or less, or it can take many hours. In order to hydrolyze the organo borate, it is necessary to introduce into the mixture a minor amount of water. In view of the inherent hydrolytic instability of the organo borates, the moisture level present in air under ordinary atmospheric conditions has been found to be sufficient to effect hydrolysis. A minor amount of water can be added, for example, a few drops at a time if the desired viscosity of the dimethyl silicon polymer is not achieved in an hour or more, such as if the mixing is done in a closed system, or in an extremely dry atmosphere, i.e., below 10 percent relative humidity. Under these conditions, it is preferred to use a more easily hydrolyzed alkyl borate instead of an aryl borate.

Depending upon the elastic and plastic properties desired in the silicone polymer, varying amounts of the organo borate can be employed with the dimethyl silicone oil. Various fillers and modifiers can then be added to tailor the resulting dimethyl silicone polymer to the consistency desired. Fillers such as lithopone, zinc oxide, bentonite, fumed silica, precipitated silica, etc. can be employed in proportions varying from 0 to 3 parts of filler per part of the dimethyl silicone polymer. In addition, modifiers such as oleic acid, ferric stearate, glycerine, diethylene glycol, can be added in amounts ranging from 0.01 to .1 part per part of the mixture of the dimethylsilicone polymer and filler, to alter the softness or hardness of the reinforced silicone polymer in accordance with procedures known to the art.

In order that those skilled in the art will be better able to practice the invention, the following example is given by way of illustration and not by way of limitation. All parts are by weight.

A silanol chain-stopped polydimethylsiloxane utilized in Example 1 below, to illustrate, the practice of the present invention is prepared as follows.

There is added gradually to 400 parts of dimethyldichlorosilane, 50 parts of water and 103 parts of dioxane while the resulting mixture is stirred. During the addition the temperature is maintained at about 0° C. The mixture is allowed to separate and the top oily layer is stripped to a temperature of 210° C. The residue is mixed with 50 parts of acetone and added slowly to 75 parts of sodium bicarbonate in 100 parts of acetone. The resulting mixture is stirred for 30 minutes at 10° C. and filtered. There is recovered 164 parts of a silanol chain-stopped polydimethylsiloxane having a viscosity of about 25 centipoises and a silanol content of 1.4% as determined by the Zerewitinoff method.

EXAMPLE 1

There is added with vigorous stirring to 25 parts of the above dimethyl oil, 0.3 part of trimethoxy-boroxene. After six minutes at a temperature of 27° C. a gel is formed. Mixing is continued for an additional 5 minutes until a dimethyl silicone polymer was obtained having a viscosity of about $10^6$ centipoises at a shear rate of 1 sec.$^{-1}$.

A twenty parts sample of the above dimethyl silicone polymer is milled with three parts of lithopone. In addition, about 0.1 part of glycerine and 0.2 part of oleic acid is also added.

A prior art dimethyl silicone polymer is prepared as follows in order to compare the properties of a prior art polymer with the polymer prepared in accordance with the practice of the present invention as shown above in Example 1.

A mixture of twenty-five parts of dimethyl silicone oil prepared by heating with agitation, 100 parts of octamethylcyclotetrasiloxane to 110° to 155° C., in the presence of .0001 part of potassium hydroxide for about 4 hours is mixed with 1.4 part of boric oxide and 0.5 part of ferric chloride. The mixture is heated for 3 hours at 150° C. The mixture is cooled rapidly to room temperature with Dry Ice and blended with 3 parts of lithopone and 0.1 part of glycerine.

A sample of the dimethyl silicone polymer of Example 1 is compared to an equivalent sample of the prior art. In Table I below, "Percent Rebound" signifies the percent of rebound experienced by both samples when dropped in the form of a ball respectively, onto a stone surface from a weight of 100 cm. Williams plasticity indicates the flow characteristics of polymer and is measured on a Scott Model P–1 plastometer by putting a 5 lb. load on a 5 gram sample of a dimethyl silicone polymer in the form of a ball and measuring its thickness in mil after 60 seconds.

Table I

| | Percent Rebound | Williams Plasticity/mil |
|---|---|---|
| Example 1 | 61 | 50 |
| Prior Art | 60 | 49 |

The above data clearly shows that the plastic bouncing putty compositions made in accordance with the practice of the present invention are comparable to the prior art plastic bouncing putty compositions, although the cure of the dimethyl silicone oil is effected at room temperature. There is provided, by the present invention therefore a significant improvement over the prior art method for making plastic putty-like organopolyslioxane compositions that exhibit a high degree of elasticity under suddenly applied stress.

While the foregoing example has been limited to only a few of the very many variables within the scope of the present invention, it should be understood that the present invention is directed to the production of a much broader class of organopolysiloxane compositions that exhibit a high degree of elasticity under suddenly applied stress by mixing together the silanol chain-stopped polydiorganosiloxane of Formula 1 with an organo borate of Formulae 2 and 3 in accordance with the practice of the present invention.

What I claim as new and desire to secure by Leters Patent of the United States is:

1. A process for the production of plastic organopolysiloxane compositions that exhibit a high degree of elasticity under suddenly applied stress comprising agitating at a temperature in the range of 20° C. to 30° C., a mixture comprising an alkyl borate and 20 to 200 parts, per part of said alkyl borate of a silanol chain-stopped polydimethylsiloxane having the formula

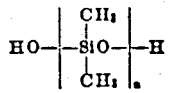

until a product is formed having a viscosity of at least 500,000 centipoises at a shear rate of 1 sec.$^{-1}$ at 25° C., where $n$ is equal to from 10 to 1500.

2. A process comprising forming a mixture of lithopone and the product of claim 1, where there is utilized up to three parts of lithophone, per part of said product.

3. A process in accordance with claim 2, where the mixture contains up to 0.1 part of a member selected from the class consisting of glycerine, oleic acid, and ferric stearate, per part of mixture.

References Cited by the Examiner

UNITED STATES PATENTS

| | | | |
|---|---|---|---|
| 2,371,068 | 3/45 | Rochow | 260—46.5 |
| 2,541,851 | 2/51 | Wright | 260—46.5 |
| 2,721,857 | 10/55 | Dickman | 260—46.5 |
| 2,842,521 | 7/58 | Nitzsche et al. | 260—45.5 |
| 2,851,439 | 9/58 | Clark | 260—46.5 |

LEON J. BERCOVITZ, *Primary Examiner.*

HAROLD N. BURSTEIN, WILLIAM H. SHORT, MURRAY TILLMAN, *Examiners.*